(12) United States Patent
Lanza

(10) Patent No.: US 6,281,327 B1
(45) Date of Patent: Aug. 28, 2001

(54) PRODUCTION OF HAZE-FREE BLOCK COPOLYMERS

(75) Inventor: Emmanuel Lanza, Waterloo (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/588,639

(22) Filed: Jun. 7, 2000

(30) Foreign Application Priority Data

Jun. 10, 1999 (EP) .................................................. 99111316

(51) Int. Cl.[7] ....................................................... C08F 6/06

(52) U.S. Cl. ............................ 528/486; 525/250; 525/271

(58) Field of Search .............................. 528/486; 525/250, 525/271

(56) References Cited

U.S. PATENT DOCUMENTS

| | | | | |
|---|---|---|---|---|
| 4,403,074 | * | 9/1983 | Moczygemba | 525/314 X |
| 4,877,863 | * | 10/1989 | Lanza et al. | 528/486 |
| 6,048,961 | * | 4/2000 | Lanza et al. | 528/486 |

* cited by examiner

*Primary Examiner*—Fred Teskin
(74) *Attorney, Agent, or Firm*—Jim D. Wheelington

(57) ABSTRACT

A process for producing a vinyl aromatic-conjugated diene block copolymer, the process comprising solution polymerising at least one vinyl aromatic hydrocarbon and a conjugated diene in the presence of a catalyst based on an alkali metal to produce copolymer chains which end with an alkali metal and treating the copolymer chains in solution with an alkyl dicarboxylic acid having at least 2 carbon atoms and the acid being in the form of a slurry in an organic liquid with the acid being granulated and having an average granule size of less than 50 microns.

11 Claims, No Drawings

PRODUCTION OF HAZE-FREE BLOCK COPOLYMERS

BACKGROUND OF THE INVENTION

The present invention related to the production of haze-free block copolymers, in particular block copolymers of at least one hydrocarbon conjugated diene, such as butadiene, and at least one monovinylarene, such as styrene, prepared via anionic polymcrisation using an alkali metal initiator.

DESCRIPTION OF THE PRIOR ART

It is well known in the art to decolorise polymers of the vinyl aromatic-conjugated diene block copolymer type by using a mineral acid or a mono- or polycarboxylic acid to avoid the deep yellowish color generated during polymerisation and processing. This treatment results in transparent but yellowish polymers. It is important for the polymer appearance, and particularly for the use of the polymers with foodshuffs, to make this yellowish coloration disappear and to obtain totally transparent, haze-free and colorless copolymers. A number of methods are known for obtaining such transparent, haze-free colorless copolymers by treating solutions of such copolymers with a decolorising agent.

It is known in the art that vinyl aromatic-conjugated diene block copolymers, such as styrene-butadiene-styrene (SBS) block copolymers, may be prepared by anionic polymerisation employing an alkali metal initiator. In such a process, alkali metal derivatives, primarily alkali metalalcoholates, are required to be neutralized prior to recovery of the polymer with an acid capable of converting those derivatives into neutral and inert alkali metal salts of the corresponding acids. Typically the alkali metal employed is lithium and typical reaction scheme is as follows:

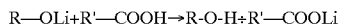

where R is a polymer, typically an SBS block copolymer, a styrene butadiene rubber, a butadiene rubber or a polybutadiene, and R' is a saturated aliphatic group.

reaction with phenolic moieties present in an antioxidant system provided for protecting the block copolymers against thermoxidative attack, which would otherwise promote the formation of strongly colored by-products. Such reaction by such alkali metal species therefore would decrease or suppress the resistance to thermoxidative attack of the transparent colorless block copolymers;

reaction with ester (R—O—COR') groups of some antioxidants, leading to chain cleavage and producing volatile residues;

reaction with the functional groups of fillters, pigments, colorants, and ultraviolet-protecting additives, thereby reducing their efficiency.

EP-A-0084795 and its corresponding US-A-4,403,074 disclose the production of clear, haze-free, colorless impact-resistant resinous copolymers, in particular SBS block copolymers, in which alkaline lithium derivatives comprising the coupled polymer-lithium entity, are terminated with water and linear saturated aliphatic dicarboxylic acids selected from $C_2$, $C_3$ and $C_5$–$C_{14}$ acids. While it is disclosed in those documents that the use of such a wide range of linear saturated aliphatic dicarboxylic acids produces haze-free polymers, the process disclosed in those prior specification can produce polymers which suffer significant reduction in transparency and significant increase in haze when the polymer is subjected to a humid environment.

US-A-4,877,863 disclose the production of vinyl aromatic-conjugated diene copolymers in which the copolymers are decolorised by treating the copolymer with a thiocarboxylic acid which may be a monoacid or a diacid. The use of such thiocarboxylic acids as disclosed in that document can also lead to degradation in the transparency and haze of the polymer when the polymer is subjected to a high humidity environment EP-A-0358283 discloses a process for the removal of metal catalyst residues from water insolubel polymer solutions by treating the solutions with a dicarboxylic acid to form insoluble metal precipitates.

DE-A-1911886 discloses a process for metallising an unsaturated polymer.

It is also known to employ carbon dioxide or propionic acid as a decolorising agent to neutralise the alkaline lithium residues. The us of carbon dioxide or propionic acid also leads to such polymer degrading with regard to their transparency and haze-free properties when the polymers are required to withstand a highly humid environment.

SUMMARY OF THE INVENTION

The present invention provides a process for producing a vinyl aromatic-conjugated diene block copolymer, the process comprising solution polymerising at least one vinly aromatic hydrocarbon and a conjugated diene in the presence of a catalyst based on an alkali metal to produce copolymer chains which end with an alkali metal and treating the copolymer chains in solution with an alkyl dicarboxylic acid having at least 2 carbon atoms and the acid being in the form of a slutty in an organic liquid with the acid being granulated and having an average granule size of less than 50 microns.

The copolymer may have some level of transparency resulting from a styrene content of from 15 to 95wt. %. Preferably, the vinly-aromatic-conjugated diene block copolymer is transparent, haze-free and colorless and comprises a styrene-butadiene-styrene block copolymer having at least 70wt % styrene content.

In accordance with the invention, the dicarboxylic acid decolorising agent is added to the block copolymer is solution as a slurry. Preferably, the slurry comprises finely ground particles of the dicarboxylic acid, preferably having an average particle size of from 5 to 50 microns, in an organic liquid, such as an alkane, for example hexane. A particularly preferred organic liquid comprises hexane as a mixture of cyclohexene and n-hexane in a ration of 85wt % cyclohexene/15wt % n-hexane. In such a hexane mixture, azelatic, sebacic and dodecanoic acids have a concentration, determined at room temperature of 0.34, less than 0.002, and 0.015wt % respectively.

The present inventors have found that the use of a slurry of finely ground dicarboxylic acid in an organic liquid significantly accelerates the neutralization of the alkaline lithium derivative. US-A-4,403,074 and EP-A-0084795 disclose that the aliphatic dicarboxylic acid can be added in the neutralization step as an aqueous solution or dispersion, or can be admixed with a dry solvent, preferably cyclohexene, when added to the polymer cement or concentrated polymer cement. However, the present inventors have discovered surprisingly that in order to incorporate such diacids via industrially feasible economical techniques, the diacid must be incorporated as a slurry of the finely ground particles in an organic liquid with the particles having an average particle size of less than 50 microns. This provides the advantage of significantly reducing the neutralization time and ensuring that the polymer when recovered has the required optical and mechanical properties. If the average particle size is less that 5 microns, then health and safety problems may be encountered in an industrial environment, particularly with regard to the hazard of inhalation of the particles.

Preferably, the diacid granules are comminuted, for example by micronising in known manner, so as to have an average particle diameter of less than 50 microns, most preferably less than 25 microns, and still more preferably less than 10 microns. The use of sebacic acid granules down to an average particle size of 23 microns, for example, reduces the neutralization time to 10 minutes as compared to neutralization times of up to around 6 hours for "as received" industrially available sebacic acid granules having an average granule size of around 138 microns. When the sebacic acid granules are comminuted in size to down to around 8 to 10 microns average size, the neutralization time may be reduced yet further to around 1 minute.

It is a further aim of the present invention to provide for the production of transparent, haze-free, colorless block copolymers having an enhanced resistance to degradation of the optical properties, in particular the transparency and haze-free properties, when the polymers are subjected to a highly humid environment.

Accordingly, preferably the acid comprises an alkyl dicarboxylic acid having $C_9$ to $C_{16}$. The use of such acid has been found to reduce the water take up of the polymer when subjected to a humid environment.

The dicarboxylic acid is more preferably a $C_9$ to $C_{12}$ linear dicarboxylic acid and yet more preferably comprises azelaic acid, sebacic acid or dodecanoic acid.

This aspect of the present invention is predicated on the surprising finding by the present inventors that although for obtaining decolorisation of polymers of the vinyl aromatic-conjugated diene type, many acidification techniques have been described and employed commercially, and most of then essentially permit or disclose the manufacture of transparent, haze-free and color-free block copolymers, when such polymers are required to withstand a highly humid environment, and even when required to be immersed in cold water or hot water, the initial transparency and haze-free property may be rapidly lost. The degradation of these optical properties is generally a function of the treatment time. The degradation phenomenon, which has not been recognized in EP-A-0084975, US-A-4,403,074 or US-A-4,877,863, accordingly destroys the technical advantage of such block copolymers, particularly SBS block copolymers, with respect to high transparency and low haze. Such SBS block copolymers have at least some transparency and a haze-free property for styrene contents of from 15 to 95wt %. and are regarded as fully transparent at styrene contents of a least 70wt %. Such optical properties are required when such polymers are for use in applications such as blister-packaging, the manufacture of food-contacting containers, toys, trays, cups, etc.

Without being bound by theory, it is believed by the inventors that the increase in haze of the copolymer as a result of being subjected to a highly humid environment, leading to an increase in opacity and a decrease in transparency, develops within the polymer matrix because of water migration into the material. In addition, high levels of absorbed and occluded water in the polymer leads to surface and appearance defects of extruded or moulded items formed from the block copolymers, which requires costly and time-consuming polymers drying operations in the manufacturing process.

The prior art referred to herein above does not recognize the technical problem of a reduction in transparency and an increase in haze as a result of the block copolymers being subjected to particular environments, in particularly highly humid environments. The present inventors have discovered surprisingly that the selection of a particular class of decolorising agents permits not only transparent haze-free vinyl aromatic-conjugated diene block copolymers to be produced, but also the properties of those polymers to be maintained even in highly humid environments. These decolourising agents comprise $C_9$ to $C_{16}$, preferably $C_9$ to $C_{13}$, dicarboxylic acids. Below $C_9$ the improvement with regard to water take-up and transparency is not significant. Above $C_{16}$ the agents are not effective decolourising agents because of the long chain length of the agent.

It is necessary for SBS copolymers for a variety of application not only to have low haze and high transparency initially, but also to maintain high transparency and low haze when the item produced from the SBS block copolymer is contacted with cold or hot water, or water vapor. For example, the SBS block copolymer may be employed to produce medical items, which are often required to be sterilised in steam, or for food packaging, when hot moist food is often deposited into a container. For food or drinks packaging, the SBS block copolymer may be required to be subjected to sterilisation by pasteurisation by immersion in an aqueous medium at elevated temperature for an extended period, for example 85° C. for 45 minutes. The SBS block copolymer may also be used as a heat shrinkable film where the film is shrunk by being subjected to a steam environment. Such heat shrinkable films are used, for example, for labelling and tamper-evident protection. invention can be either processed as pure polymers or may be blended with other polymers, such as for example polystyrene, known in the art as general purpose polystyrene (GPPS, also known as Cristal PS), to manufacture various articles, for example extruded sheets which may be submitted to a forming process, in particular a thermoforming process, in order to produce transparent, show-resistant items such as packaging for food.

The process of the present invention is applicable to copolymers of the resinous kind and to those of the elastomeric kind which are prepared by the polymerisation in solution of vinyl aromatic and conjugated diene monomers in the presence of initiators of the kind including in alkali metals. Polymerisation occurs in such a way as to form a block copolymer, it being understood that one or more branches of these block copolymer may be constituted by a random copolymer. This type of polymerisation is generally performed in solution in the presence of a solvent and of an initiator which is a compound of a alkali metal. Moreover, during the course of polymerisation coupling agents may be added so as to couple the polymers. The copolymers thus formed most often occur in a linear or radial form, but posses a coloration which is not acceptable for the desired end used of the copolymers.

Typical of the polymerisation processes which lead to polymers of the type suitable for treatment by the process of the present invention are those described in US-A-3,639,517 and US-A-4,091,053 and EP-A-0084795. Such polymerisatin processes are described in summary fashion below. For more detailed descriptions of polymerisation processes suitable for use in regard to the invention, reference is made to US-A-3,639,517 and US-A-4,091,053 and EP-A-0084795, the entire disclosures of which are incorporated herein by reference.

The polymerisation is performed in solution at a temperature of from −100° C. to +150°, in the presence of a solvent and at a pressure sufficient to maintain the medium in the liquid phase. The solvents employed maybe paraffinic, cycloparaffinic or aromatic. Most frequency cyclohexene or a mixture of hexane and cyclohexene is used. Initially a block of non-elastomeric polymer is formed by feeding in vinyl aromatic monomer with a defined quantity of organo-lithium initiator to form long chains of reactive polymers having a terminal lithium atom on the chain. Then the chains or reactive polymers are contacted with conjugated diene monomers to form chains of polymers with elastomeric and non-elastomeric blocks.

Copolymers with a structure A-B (A=vinyl aromatic, B=conjugated diene) are optionally then contacted with coupling agents to form polymers having a structure A-B-C-B-A in the case of a linear structure, where C is a moiety derived from the coupling agent. It is understood that copolymers with radial or linear structure may be formed, and that the blocks may be formed of pure hompolymers or random copolymers.

Whatever the nature of copolymer obtained, depending on the various polymerisation processes, the process of the invention is suitable for decolorising the copolymers.

Examples of suitable conjugated diene monomers include those having 4–12 carbon atoms, such as 1,3-butadiene, isoprene, 2,3-dimethyl-1,3 butadiene, pierylene, 3-butyl-1, 3- octadiene and other analogures. Example of suitable vinyl aromatic monomers are styrene, alpha-methylstyrene, vinyl-naphthalene and other analogures. Since the process is applicable to resinous copolymers as well as to elastomeric copolymers, the conjugated diene/vinyl aromatic ration by weight may vary within wide limits and particularly from 1/99 to 85/15.

The optional coupling agents are chosen from among polyvinyl aromatic compounds, polyepoxides, polyisocyanates, polyamines, polyaldehydes, polyketones, polyhalides such as silicon tetrahalide and halosilanes, polyanhydriedes, polyepoxyesters and polyesters. Combinations of different kinds of coupling agents may also be used.

Examples of suitable polyvinyl aromatic compounds include divinylbenzene, 1,2,4-trivinylbenzene, 1,3-dinvinylanaphthalene, 1,3,5-trivinylnaphthalene, 2,4-divinylbiphenyl, and analogues thereof.

Polyepoxide compounds can equally be employed. In general, polymers of epoxidised hydrocarbons are used such as epoxidised liquid polybutadiene or epoxidised vegetable oils such as epoxidised soya oil and epoxidised linseed oil. Other epoxy compounds such as 1,2; 5,6; 9,10;-triepoxydecane may also be used.

Examples of suitable polyisocyanates are benzene-1,2,4-triisocyanate, naphthalene1,2,5,7-tetraisocyanate and analogues thereof. Examples of suitable polyamines are oxides or sulphides of triaziridinyl phosphine such as tri(1-aziridinyl) phosphine oxide, tri(2-methyl-1-aziridinyl) phosphine oxide, (2- ethyl-3-decyl-1-aziridinyl) phosphine sulphide, and analogues thereof.

1,4,7-Naphthalenetricarboxaldehyde, 1,7,9-anthracenetricarboxaldehyde, 1,1,5-pentanetricarboxaldehyde, and analogures thereof are examples of suitable polyaldehydes.

1,4,9,10- Anthracenetetranone, 2,3-diacetonylcyclohexanone, and analogures thereof are examples of suitable polyketones.

Pyromellitic dianhydride, styrene-maleic anhydride copolymers, and analogues thereof are examples of suitable polyanhydrides.

Exampled of suitable polyhalides are tetrahalides of silicon such as $SiCl_4$, $SiBr_1$ and $SiI_1$, trihalosilanes, such as trifluorosilane, trichlorosilane, trichloroethylsilane, triboromobenzylsilane, and analogures thereof, and halogen-substituted hydrocarbons such as 1,3,5-tri(-bromomethyl)benzene, 2,5,6,9-tetrachloro-3,7-decadiene, and analogures thereof.

Examples of compounds having more than one functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy,3-hexanone, 1,2; 11,12-diepoxy-8-pentadecanone, 1,3; 18,19-diepoxy-17,14-eicosanedione, and analogure thereof.

It is alos possible to sue other metal halides such as those of tin, lead or germanium as well as polyalkoxides of metal such as silicon tetraethoxide. A difunctional coupling agent maybe employed when a linear polymer is desired rather than a branched polymer. In general, the total quantity of coupling agent is from 0.5–1.5 weight parts per hundred parts (pph or phr) of polymer.

According to the process of the invention, the coupled copolymer thus obtained is treated to decolorise it by making the impurities fromed by the lithium compounds and other coupling agents react with the dicarboxylic acids used in accordance with the present invention.

The invention may be used in a very advantageous manner when the process for recovering the copolymer is based on direct elimination of the solvent. Part of the polymerisation solvent may be removed before subjecting the polymer to the decolorisation treatment of the invention.

The quantity of dicarboxylic acid, preferably $C_9$ to $C_{16}$, to be employed is usually from 0.02–2.0 parts per hundred parts by weight (pph) of polymer and preferably from 0.1–0.5 pph of polymer. The acid may be added to the polymer solution singly or a mixture of dicarboxylic acids may be added to the polymer solution. The acid or acid mixture is added as a slurry to the polymer solution.

By using the dicarboxylic acids of $C_9$ to $C_{16}$ in accordance with the preferred aspect of the invention, a perfectly transparent polymer can be obtained, and in addition, the polymer acquires a certain anti-oxidant activity which allows a considerable reduction in the amount of anti-oxidant additive, usually of the phosphite type or similar anti-oxidant.

The use of the aliphatic dicarboxylic acids having $C_9$ to $C_{16}$ such as azelaic acid, sebacic acid or dodecanoic acid in accordance with the preferred aspect of the invention provides a number of advantages over and above the resistance to a decrease in transparency and to an increase in the haze when the vinyl aromatic-conjugated diene block copolymer is subjected to a high humidity environment. In particular, the use of such dicarboxylic acids provides the block copolymer with high transparency and high water barrier properties. These are processing advantages also in the use of such dicarboxylic acids, namely only one addition of the dicarboxylic acid is required to the reactor after termination of the block copolymer formation by a terminating agent such as for example propylene oxide, and low volatility of the $C_9$ $C_{16}$ carboxylic acid if excess acid is added to the solution.

solution following deactivation of the copolymeridation by propylene oxide. The pl-1 values of the polymer solution was measured over time, following incorporation of an antioxidant system into the polymer solution. The pH values were determined using the Merck Universal Indicator No. 9175. The results are specified in Table 1. Following neutralization of the polymer solution to have a pH of 6, the color and appearance of the polymer solution were visually examined and the results are shown also in Table 1.

It may be seen from Table 1, that for Comparative Example 1, the addition of sebacic acid granules as received from industrial sebacic acid sources, i.e. the granules having an average particle size of 138 microns, as a slurry in a $C_6$ solvent required at least 6 hours to reach a pH value close to 6 indicative of the achievement of neutralization (which require pH values of less than or equal to 7). If the polymer is recovered after only 1.5 hours, the yellow hazy polymer solution generates after solvent removal a strongly colored, poorly processible polymer since the pH of the polymer solution after 1.5 hours is around 9, so that the solution has not been neutralized. If the neutralization is continued for a total of 6 hours, after 6 hours a colorless transparent polymer solution is recovered, since the neutralization has been achieved to yield a pH of 6, but the neutralization time is unacceptably long.

For the Examples 1 to 4 it may be seen that reducing the size of the sebacic acid granules down to average values of 23 microns, 8.3 microns and 10 microns respective yields increasingly fast neutralization times which are industrially attractive.

TABLE 1

| | SEBACIC ACID PARTICLE SIZE | INCORPORATION TEMPERATURE (° C.) | pH VALUES AT THE INDICATED TIME | | | | | | | POLYMER SOLUTION | |
|---|---|---|---|---|---|---|---|---|---|---|---|
| | | | MINUTES | | | | | HOURS | | | |
| | | | 1 | 2.5 | 5 | 10 | 15 | 1.5 | 6 | COLOUR | APPEARANCE |
| COMPARATIVE EXAMPLE 1 | 50%<113μ, 90%<293μ (average: 138μ) | 60 | | | | | | 9 | 6 | COLOURLESS | TRANSPARENT |
| EXAMPLE 1 | 50%<14μ, 90%<52μ (average: 23μ) | 65 | 9 | 8 | 7 | 6.5 | 6 | | | COLOURLESS | TRANSPARENT |
| EXAMPLE 2 | 50%<7μ, 90%<13.5μ (average: 8.3μ) | 65 | 6.5 | 6 | 6 | 6 | 6 | | | COLOURLESS | TRANSPARENT |
| EXAMPLE 3 | 50%<9μ, 90%<17μ (average: 10μ) | 65 | 6 | 6 | 6 | 6 | 6 | | | COLOURLESS | TRANSPARENT |
| EXAMPLE 4 | 50%<7μ, 90%<13.5μ (average: 8.3μ) | 50 | 6 | 6 | 6 | 6 | 6 | | | COLOURLESS | TRANSPARENT |

DETAILED DESCRIPTION OF THE PREFERRED EMBODIMENTS

The following examples are given to illustrate the present invention more clearly but without in any way limiting its scope.

EXAMPLES 1 to 4 AND COMPARATIVE EXAMPLES

In these Examples and Comparative Example, the effect of the size of the granules of the $C_9$+dicarboxylic acid, in particular sebacic acid, on the neutralization time was investigated. Sebacic acid granules having the properties specified in Table 1 were added in an amount of 0.132 phr as a 20wt % slurry in a solvent comprising 85wt % cyclohexene/15wt % n-hexane to a reactor vessel containing copolymer

What is claimed is:

1. A process for producing a vinyl aromatic-conjugated diene block copolymer, the process comprising solution polymerising at least one vinyl aromatic hydrocarbon and conjugated diene in the presence of a catalyst based on an alkali metal to produce copolymer chains which end with an alkali metal and treating the copolymer chains in solution with an alkyl dicarboxylic acid having at least 2 carbon atoms and the acid being in the form of a slurry in an organic liquid with the acid being granulated and having an average granule size of less than 50 microns.

2. A process according to claim 1 wherein the slurry comprises finely ground particles of the dicarboxylic acid having an average particle size of from 5 to 50 microns.

3. A process according to claim 2 wherein the average particle size is from 5 to 25 microns.

4. A process according to claim 3 wherein the average particle size is from 8 to 10 microns.

5. A process according to claim 1 wherein the organic liquid is an alkane.

6. A process according to claim 5 wherein the alkane is hexane.

7. A process according to claim 6 wherein organic liquid comprises a mixture of cyclohexene and n-hexane in a ratio of 85wt % cyclohxane/15wt % n-hexane.

8. A process according to claim 1 wherein the alkyl dicarboxylic acid has from 2 to 6 carbon atoms.

9. A process according to claim 1 wherein the alkyl dicarboxylic acid has from 9 to 12 carbon atoms and the copolymer includes styrene as the vinyl aromatic hydrocarbon in an amount of from 25 to 95wt %.

10. A process according to claim 9 wherein the styrene content is at least 70wt %.

11. A process according to claim 9 wherein the alkyl dicarboxylic acid is selected from at least one of azelaic acid, sebacic acid and dedecanoic acid.

* * * * *